March 29, 1955  J. F. CASTAGNA  2,705,299
ELECTRIC MOTOR DRIVEN CONSTANT SPEED DRIVE
Filed Nov. 19, 1953
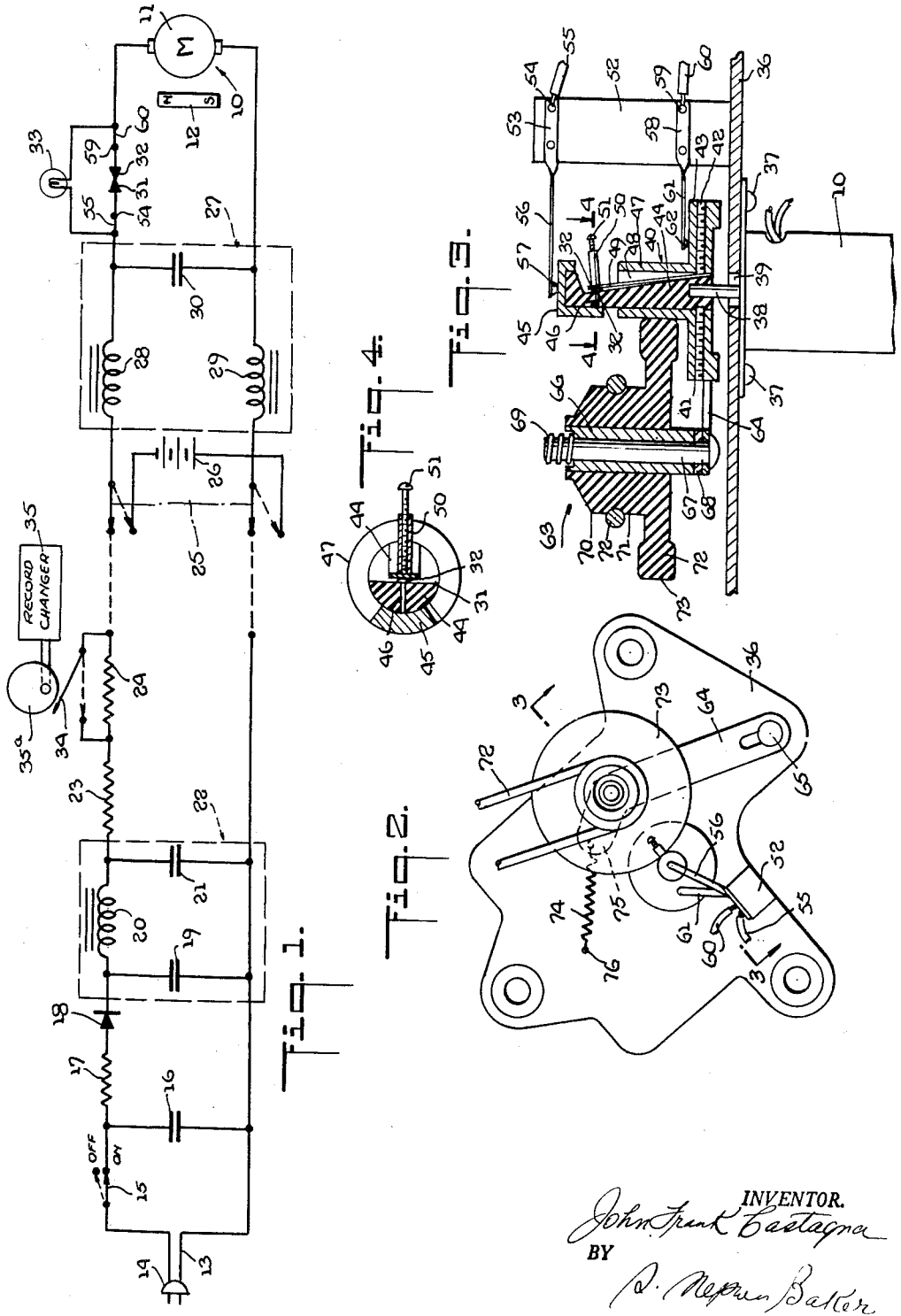
INVENTOR.
John Frank Castagna
BY
A. Nepreu Baker
ATTORNEY

United States Patent Office 2,705,299
Patented Mar. 29, 1955

2,705,299

ELECTRIC MOTOR DRIVEN CONSTANT SPEED DRIVE

John Frank Castagna, Brooklyn, N. Y.

Application November 19, 1953, Serial No. 393,044

4 Claims. (Cl. 318—325)

The present invention relates to a high efficiency constant speed drive and more particularly to an electrically operated drive which may be energized alternatively from a battery of small, 1½ volt dry cells or from a source of either direct or alternating current.

A feature of the invention is the provision of a constant speed drive of this character in which the precision of the speed regulation is sufficiently great to permit its use for driving a highly critical mechanical load, such as a phonograph turntable, or a tape recorder, for example.

The drive comprises a high efficiency direct current motor having a permanent magnet for supplying field excitation, the motor being controlled by an extremely sensitive centrifugal governor which utilizes a pair of contacts which operate at a relatively high frequency of interruption and which intermittently decrease the degree of energization of the motor the governor contacts being protected against burning by a spark suppressor which includes a resistor having a high positive temperature coefficient of resistance, such as a metallic filament of an incandescent lamp, a ballast lamp, or similar device.

The governor keeps the motor speed constant regardless of fluctuations of input voltage and notwithstanding small variations in load.

As applied to phonographs, the drive of the present invention reduces objectionable "wow" effects caused by variations in the speed of the record because the construction of the governor is substantially balanced.

The drive of the present invention includes a governor which causes only a slight increase in current with respect to the current which would otherwise be required by the motor without any governor. When applied to a small high efficiency motor, it permits drycell operation of phonographs, tape recorders or other devices requiring a constant speed drive.

The device of the instant invention further permits temporary operation of a load requiring high torque such as during the record changing cycle of a phonograph provided with an automatic record changer. The device automatically applies a higher voltage to the small motor so that it may handle the load although such a higher voltage, if applied during playing time, would be outside the range of regulation of the governor.

Other and further objects and advantages of the invention will become apparent upon reading the following specification together with the accompanying drawing forming a part hereof.

Referring to the drawing:

Figure 1 is a schematic electrical circuit diagram of an embodiment of the invention;

Figure 2 is a plan view showing the mechanical portion of the embodiment illustrated in Figure 1;

Figure 3 is a sectional view in elevation taken generally along the line 3—3 of Figure 2;

Figure 4 is an enlarged plan sectional view taken along the line 4—4 of Figure 3.

Referring to Figure 1, a conventional small electric motor designated generally as 10 is shown provided with an armature 11 and a permanent magnet 12 which provides field excitation for the armature 11. Inherently, the speed and direction of rotation of motor will be determined by the voltage applied to armature 11 and the mechanical load connected to the motor.

The motor is energized from a commercial power source through the visual flexible two conductor cord 13 whose free end is shown terminated by an attachment plug cap 14 adapted for connection to a power outlet (not shown). The circuit extends from cord 13 through a main power switch 15 having "On" and "Off" positions to a radio frequency filter capacitor 16 which serves to drain off high frequency noise components at the power supply connection. A surge limiting resistor 17 is connected in series with a half-wave rectifier 18 to a power supply filter capacitor 19 and through a power supply filter choke coil 20 to a further power supply filter capacitor 21. The choke coil 20 together with the capacitors 19 and 21 constitute a filter designated generally as 22 for filtering the output of half-wave rectifier 18 when the cord 13 is connected to an alternating current supply.

From the filter 22, the circuit extends through two further voltage dropping resistors 23 and 24 to a doublepole, double-throw battery switch 25 which is selectively operable to energize the drive either from the power source to which cord 13 may be connected or from a battery 26 which may conveniently be a dry cell battery or a small storage battery where the drive is used in a portable phonograph or other portable device.

From the battery switch 25 the circuit extends to the motor 10 through a radio frequency noise filter 27 comprising two filter chokes 28 and 29 and a filter capacitor 30, the circuit being completed through a pair of governor contacts 31—32. Governor contacts 31—32 are shunted by a spark suppressor resistor 33 having a high positive temperature coefficient of resistance and which is illustratively indicated as a metallic filament incandescent lamp. A tungsten filament lamp will change its temperature rapidly in response to changes in filament current and will provide a hot to cold resistance ratio of the order of 10 to 1. Other devices having similar characteristics are also suitable for use.

In the operation of an automatic record changer, the change cycle requires increased torque from the motor 10. This is effected by a switch 34 which is arranged to automatically shunt out the voltage dropping resistor 24 under such circumstances, thereby increasing the current flow through armature 11 during such change cycle. A record changer mechanism 35 drives an eccentric cam 35a which rotates and closes the switch 34 during that portion of the cycle of operation of the record changer 35 where increased torque is needed as compared with the small relatively constant torque which is used when driving the turntable. When motor 10 is connected to battery 26, armature 11 is free to draw whatever current is needed to develop the desired torque, since there is no voltage dropping resistor in the battery circuit.

Referring to Figures 2 to 4, the motor 10 is suspended from a mounting plate 26 by screws 37. The drive shaft 38 of motor 10 extends upwardly through a clearance hole 39 in mounting plate 36. A drive pulley 40 of electrically conductive material is fixedly secured to the upper end of motor shaft 38 by set screws 41 and 42 which are disposed in a lower flange portion 43 of drive pulley 40. The set screw 41 bears directly against an insulating bushing 44 and the set screw 42 serves an additional purpose as described below. The insulating bushing 44 is mounted on the upper end of motor shaft 38 and thus insulates the drive pulley 40 from the motor 10 and from the mounting plate 36.

The insulating bushing 44 extends upwardly beyond drive pulley 40 and at its upper end it carries a cap 45 formed of electrically conductive material and fixedly secured to insulating bushing 44 by an electrically conductive pin 46. The governor contact 31 is fixed to the inner end of the pin 46 and may conveniently form the head portion of the pin.

Drive pulley 40 comprises a hollow shank portion 47 which surrounds insulating bushing 44. Insulating bushing 44 is cut away intermediate its ends to form an upwardly flaring recess 44 extending from just above the flange portion 43 of drive pulley 40 to a point below the top of cap 45. A resilient contact arm 49 is disposed in the flaring recess 48, its lower end being pressed against insulating bushing 44 by the set screw 42 which thus serves to hold contact arm 49 properly positioned and at the same time connects contact arm 49 electrically to drive pulley 40.

At its upper end, contact arm 49 carries the governor contact 32, together with a centrifugal weight 50. Contact arm 49 is pre-stressed to urge the governor contact 32 yieldingly into engagement with the other governor contact 31. The centrifugal weight 50 comprises an outwardly directed screw portion 51 which may be turned to adjust the radial position of the weight system 50—51 with respect to the axis of rotation of drive pulley 40. This will correspondingly adjust the magnitude of the angular velocity of drive pulley 40 which is required to produce sufficient centrifugal force acting on weight system 50—51 to overcome the contact pressure produced by pre-stressed resilient arm 49 and thereby cause governor contact 32 to move radially outwardly away from contact 31.

An upright post 52 is rigidly fixed to mounting plate 36 and is formed of suitable insulating material. An upper contact arm 53 is secured to post 52 and is provided with a terminal 54 for the connection of a conductor 55 which forms a part of the energizing circuit for motor 10. Arm 53 is provided with a flat resilient horizontally extending portion 56 which at its free end carries a contact 57. Arm 53 is pre-stressed to yieldingly urge contact 57 into engagement with the upper surface of cap 45, thereby effecting electrical connection of conductor 55 to governor contact 32 during operation of motor 10.

A lower contact arm 58 is secured to post 52 below the upper contact arm 53 is provided with a terminal 59 for the connection of a conductor 60 which forms a part of the energizing circuit for motor 10. Lower contact arm 58 is similarly provided with a flat resilient horizontally extending portion 61 which carries a contact 62 secured to its free end. Lower contact arm 58 is pre-stressed to urge contact 62 yieldingly into engagement with the upper surface of the flange portion 43 of drive pulley 40, thereby effecting connection of conductor 60 to governor contact 32 during operation of motor 10 and rotation of drive pulley 40.

An intermediate drive pulley designated generally as 63 is mounted on a supporting arm 64 which is pivoted to mounting plate 36 at 65 for movement in a horizontal plane. Intermediate drive pulley 63 comprises a central metallic anti-friction bushing 66 which freely revolubly engages a vertical shaft 67 carried by the free end of supporting arm 64. Bushing 66 is yieldingly urged downwardly against an anti-friction washer 68 by a helical compression spring 69 disposed at the upper end of vertical shaft 67.

Intermediate drive pulley 63 comprises a resilient body portion 70 of rubber or rubber-like composition which is carried by anti-friction bushing 66. The body portion 70 is grooved at 71 to receive an endless belt 72 which extends to the driven mechanical load (not shown). The resilient body 70 further comprises a flange portion 72 having a peripheral friction surface 73 which is pressed against the hollow shank portion 47 of drive pulley 40 by a helical tension spring 74. One end of spring 74 is secured to a projection 75 from the free end of supporting arm 64 and the other end is secured to a fixed pin 76 on mounting plate.

The endless belt 72 is extended generally in the direction of a line passing through the pivot 65 of supporting arm 64 so that changes in belt tension and in load will not affect the pressure of engagement between the peripheral friction surface 73 of intermediate drive pulley 63 and the shank 47 of drive pulley 40. With the arrangement shown in Figure 2, the directions of rotation indicated by the arrows are so selected that an increase in load transmitted by belt 72 will produce a force having a component tending to increase the pressure between friction surface 73 and shank 40. The initial or no-load tension in belt 72 will have no effect on the friction pressure because the belt is directed symmetrically along a line passing through the centers of shaft 67 and pivot 65.

While the governor has been shown by way of illustration as being mounted on the motor shaft 38, it could be embodied in the intermediate drive pulley 63 or connected to some part of the driven load.

In operation, the drive may be energized from an alternating current source by inserting attachment plug cap 14 into a suitable outlet receptacle. The half-wave rectifier 18 will produce a smooth direct current at the output of filter 22, which current will be limited by the voltage dropping resistors 23 and 24 so that the voltage appearing at the terminals of armature 11 is approximately the same as the voltage of battery 26. This battery voltage might conveniently be of the order of 4½ or 6 volts, although a higher value of voltage may be desirable in certain instances. When direct current is used, rectifier 18 prevents operation of motor 10 in reverse direction if the incorrect polarity is selected.

Motor 10 is so arranged that it tends to run at a speed somewhat higher than the speed required to effect operation of governor contacts 31 and 32. This causes the governor contacts 31 and 32 to open the circuit between terminals 54 and 59, thereby causing the armature current to flow through the spark suppressor resistor 33. At the instant when contacts 31 and 32 just separate, resistor 33 is cold and its resistance is low. The voltage drop across resistor 33 is thus low at the time when it is first cut into the circuit and this low voltage will cause no appreciable arc between the governor contacts 31 and 32.

When current flows through resistor 33, it heats up very rapidly and by reason of its high temperature coefficient of resistance it immediately produces an increased voltage drop which tends to slow down motor 10. Because the governor contacts 31 and 32 have already separated, this voltage can rise to a substantial value without danger of striking an arc. As a result, motor 10 slows down, governor contacts 31 and 32 re-engage short-circuiting resistor 33, and resistor 33 rapidly cools off assuming a low resistance value for the next opening of governor contacts 31 and 32. A useful range of voltage control is thus obtained without producing destructive arcing at the governor contacts, notwithstanding any self-inductance of armature 11.

During operation, torque fluctuations will be produced by the intermittent action of governor contacts 31 and 32. These will be at least partially absorbed by the resilient coupling action of body portion 70 of intermediate drive pulley 63 which acts as a mechanical low pass filter interposed between the motor 10 and the belt 72.

*Example*

The following specific values for certain circuit elements are given by way of illustration in the case of a drive adapted for energization from alternating current of a frequency of 25 cycles or higher, 115 volts direct current or a 6 volt battery:

| | |
|---|---|
| Capacitor 16 | .05 mfd. |
| Resistor 17 | 250 ohms—2 watts. |
| Capacitor 19 | 100 mfd. |
| Resistor 23 | 400 ohms. |
| Capacitor 21 | 100 mfd. |
| Resistor 24 | 400 ohms. |

What is claimed is:

1. A drive of the class described, comprising a motor having an output shaft, an energization circuit for said motor, a drive pulley driven by said shaft, said drive pulley having a hollow shank portion, a governor contact carried by said pulley, a resilent contact arm extending generally along the axis of rotation of said pulley and disposed at least partially in said hollow shank, a further governor contact carried by said resilient arm and yieldingly urged by said arm into engagement with said first-named governor contact, means eccentrically disposed with respect to the axis of rotation of said pulley and acting on said further contact to urge the same out of engagement with said first-named contact when said pulley attains a predetermined angular velocity, circuit means connecting said governor contacts serially into said energization circuit, and means adapted for connection to a mechanical load to be driven by said pulley.

2. A drive according to claim 1, further comprising a resistor having a high temperature coefficient of resistance connected to said governor contacts, said resistor becoming heated to increase its resistance when said further governor contact moves out of engagement with said first-named governor contact.

3. A centrifugal circuit making and breaking device of the class described, comprising a revoluble body member adapted to be driven simultaneously with a device whose speed is to control the making and breaking of said circuit, said body member being balanced with respect to its axis of revolution, and elongated resiliently movable member having one end portion fixed to said body member and extending generally in the direction of said axis of revolution, weight means carried by said elongated member, the combined center of gravity of said weight means and said elongated member being radially outwardly displaced from said axis of revolution, said displacement tending to increase with increasing speed of rotation of said body, contact means carried by said body and actuable by a change in said displacement, and circuit means adapted to connect said contact means to said circuit.

4. A centrifugal circuit making and breaking device of the class described, comprising a revoluble cylindrical body member adapted to be driven simultaneously with a device whose speed is to control the making and breaking of said circuit, said cylinder being coaxial with respect to its axis of revolution, an elongated resilient contact arm having one end portion fixed to said body member and extending generally in the direction of said axis of revolution, weight means carried by said elongated member, the combined center of gravity of said weight means and said contact arm being radially outwardly displaced from said axis of revolution, said displacement tending to increase with increasing speed of rotation of said body, a relatively fixed contact carried by said body, a relatively movable contact carried by said contact arm and engageable and disengageable with said fixed contact by changes in said displacement, and circuit means adapted to connect said contacts to said circuit.

References Cited in the file of this patent

UNITED STATES PATENTS

| | | |
|---|---|---|
| 1,085,266 | Kallman | Jan. 27, 1914 |
| 1,508,827 | Valiguet | Sept. 16, 1924 |
| 2,143,920 | Lee et al. | Jan. 17, 1939 |
| 2,241,483 | Schneider | May 13, 1941 |
| 2,295,305 | Summers | Sept. 8, 1942 |
| 2,557,208 | Thunberg | June 19, 1951 |